(12) United States Patent
Chen

(10) Patent No.: US 9,225,911 B2
(45) Date of Patent: Dec. 29, 2015

(54) HANDHELD COMMUNICATIONS DEVICE AND ADJUSTMENT METHOD FOR FLASHLIGHT MODULE OF HANDHELD COMMUNICATIONS DEVICE

(71) Applicant: Wistron Corporation, New Taipei (TW)

(72) Inventor: Li-Jen Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/133,597

(22) Filed: Dec. 18, 2013

(65) Prior Publication Data

US 2015/0085181 A1 Mar. 26, 2015

(30) Foreign Application Priority Data

Sep. 24, 2013 (TW) .............................. 102134334 A

(51) Int. Cl.
*H04N 5/222* (2006.01)
*H04N 5/235* (2006.01)

(52) U.S. Cl.
CPC .................................. *H04N 5/2354* (2013.01)

(58) Field of Classification Search
None
See application file for complete search history.

(56) References Cited

U.S. PATENT DOCUMENTS

| | | | | |
|---|---|---|---|---|
| 4,666,280 A | * | 5/1987 | Miyawaki | G03B 7/16 362/18 |
| 6,167,202 A | * | 12/2000 | Fukui | 396/157 |
| 7,298,970 B2 | * | 11/2007 | Liang et al. | 396/62 |
| 2005/0134723 A1 | * | 6/2005 | Lee | G03B 15/02 348/370 |
| 2005/0157208 A1 | * | 7/2005 | Park et al. | 348/371 |
| 2005/0265014 A1 | * | 12/2005 | Matsui | G03B 15/05 362/5 |
| 2006/0193622 A1 | * | 8/2006 | Endo | G03B 7/16 396/157 |
| 2010/0020227 A1 | * | 1/2010 | Robinson et al. | 348/371 |
| 2010/0238344 A1 | * | 9/2010 | Tsai | 348/361 |
| 2011/0063412 A1 | * | 3/2011 | Tsukagoshi | 348/42 |
| 2013/0064531 A1 | * | 3/2013 | Pillman et al. | 396/62 |
| 2014/0063049 A1 | * | 3/2014 | Armstrong-Muntner | G03B 9/00 345/619 |
| 2014/0313690 A1 | * | 10/2014 | Eromaki et al. | 362/18 |

* cited by examiner

*Primary Examiner* — Twyler Haskins
*Assistant Examiner* — Wesley J Chiu
(74) *Attorney, Agent, or Firm* — Winston Hsu; Scott Margo

(57) ABSTRACT

An adjustment method for a flashlight module of a handheld communications device includes following steps: detecting a light field of at least one frame and obtaining at least one attribute; determining whether the at least one attribute satisfies a specific criterion; and selecting a specific lighting configuration from a plurality of lighting configurations supported by the flashlight module after the at least one attribute satisfies the specific criterion, wherein the plurality of lighting configurations respectively correspond to different light fields.

18 Claims, 3 Drawing Sheets

HANDHELD COMMUNICATIONS DEVICE AND ADJUSTMENT METHOD FOR FLASHLIGHT MODULE OF HANDHELD COMMUNICATIONS DEVICE

BACKGROUND OF THE INVENTION

1. Field of the Invention

The present invention relates to controlling a light source, and more particularly, to a handheld communications device and an adjustment method for a flashlight module of the handheld communications device.

2. Description of the Prior Art

Typically, the process of taking a photograph with a camera includes two parts. One part is the preview process. In this stage, an automatic exposure (AE) system adjusts the exposure time and the exposure gain of the camera, and determines whether the flashlight is required to provide the assistant exposure under the current environment. The other part is referring to the judgment of the automatic exposure in the preview process to determine whether an instantaneous large current for driving the flashlight is needed to take the photograph when the user is pressing the capture/shutter button.

Because of the convenience provided by cell phones, more and more people use cell phones as cameras, e.g. phone cameras. However, with the slim design of cell phones, the application of the flashlight is limited by the size and supplied power of a cell phone. Currently, most camera lens of cell phones use flash light emitting diodes (LEDs) as flashlights. Although the LED consumes less power compared with the xenon light, it provides dimmer light, however.

Therefore, there is a need to provide a method to effectively change a light field of an LED of a phone camera to satisfy the environment requirement, so as to make the flash LED of the phone camera be more flexible in various environments.

SUMMARY OF THE INVENTION

In accordance with exemplary embodiments of the present invention, a handheld communications device and an adjustment method for flashlight module of the handheld communications device are proposed to solve the above-mentioned problem.

According to an embodiment of the present invention, an adjustment method for a flashlight module of a handheld communications device is provided. The method includes following steps: detecting a light field of at least one frame and obtaining at least one attribute; determining whether the at least one attribute satisfies a specific criterion; and selecting a specific lighting configuration from a plurality of lighting configurations supported by the flashlight module after the at least one attribute satisfies the specific criterion, wherein the plurality of lighting configurations respectively correspond to different light fields.

According to another embodiment of the present invention, a handheld communications device is provided. The handheld communications device includes a flashlight module, a detection unit and a control unit. The flashlight module has a plurality of lighting configurations, arranged for emitting light according to a selected lighting configuration. The plurality of lighting configurations respectively corresponds to different light fields. The detection unit is arranged for detecting a light field of at least one frame and obtaining at least one attribute. The control unit is arranged for determining whether the at least one attribute satisfies a specific criterion, and selecting a specific lighting configuration from a plurality of lighting configurations after the at least one attribute satisfies the specific criterion. The control unit further selects a default lighting configuration from the plurality of lighting configuration and utilizes the flashlight module to perform an assistant exposure operation according to the default lighting configuration, wherein the detection unit detects the light field of the at least one frame after the assistant exposure operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The spirit of the present invention is determining a light field fitting the current environment, e.g. a light field having more uniform brightness or more centralized brightness and referring to the determination result to change the light field of the LED to meet the light field requirement of the environment resides when the camera of the handheld communications device is operated under a preview mode. For example, since there are usually more objects capable of reflecting the light emitted by the LED, e.g. ceilings and walls. Hence, the light having uniform light field makes the camera capture images with more objects, which makes the images better and more natural in visual. On the other hand, there are few objects capable of reflecting the light emitted by the LED, and the objects may be regarded as located at an infinite distance. Hence, when the user takes a photograph in an outdoor environment, it will be more appropriate to use the light having more centralized light field to make the central frame of the camera capture more far-away objects and have higher visual quality.

Figure 1:
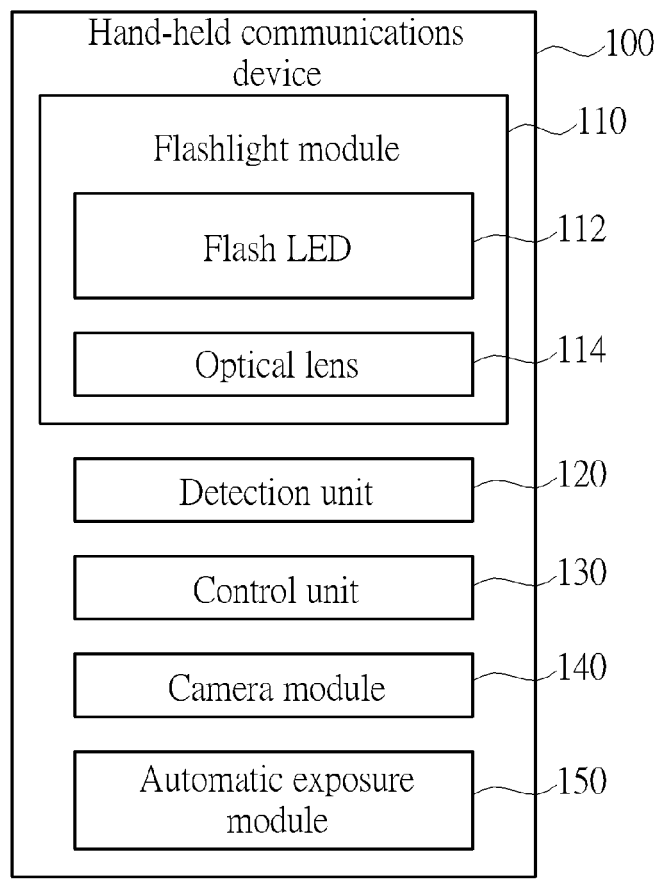
FIG. 1 is a diagram illustrating a handheld communications device according to an embodiment of the present invention.

Please refer to FIG. 1, which is a diagram illustrating a handheld communications device 100 according to an embodiment of the present invention. The handheld communications device 100 can be a personal digital assistant (PDA), a cell phone or a tablet. In the present embodiment, the handheld communications device 100 includes a flashlight module 110, a detection unit 120, a control unit 130, a camera module 140 and an automatic exposure module 150. The flashlight module 110 includes a flash LED 112 and an optical lens 114, where the flashlight module 110 supports a plurality of lighting configurations L0-L9, and is arranged for emitting light according to a selected lighting configuration. The optical lens 114 may be a second-order optical lens ($2^{nd}$ optical lens). The lighting configurations L0-L9 correspond to different light fields, respectively. For example, the light fields of the lighting configurations L0-L9 are from centralized to uniform. Hence, when the flashlight module 110 is operated in the lighting configuration L0, the most centralized light field will be obtained. Further, when the flashlight module 110 is operated in the lighting configuration L9, the most uniform light field will be obtained. Please note that, although there are merely 10 lighting configurations in the present embodiment, the present invention is not limited to that. The detection unit 120 is arranged for detecting a light field of at least one frame and accordingly obtaining at least one attribute. The control unit 130 is arranged for determining whether the at least one attribute satisfies a specific criterion. When the at least one attribute satisfies the specific criterion, the control unit 130 selects a specific lighting configuration from the lighting configurations L0-L9. The control unit 130 further selects a default lighting configuration from the lighting configuration L0-L9, and utilizes the flashlight module 110 to perform an assistant exposure operation according to the default lighting configuration, wherein the detection unit 120 detects the light field of the at least one frame after the assistant exposure operation is performed. The automatic exposure module 150 is used to determine whether the flashlight module 110 needs to be enabled according to the current environment when the camera module 140 is operated under a preview mode.

Figure 2:
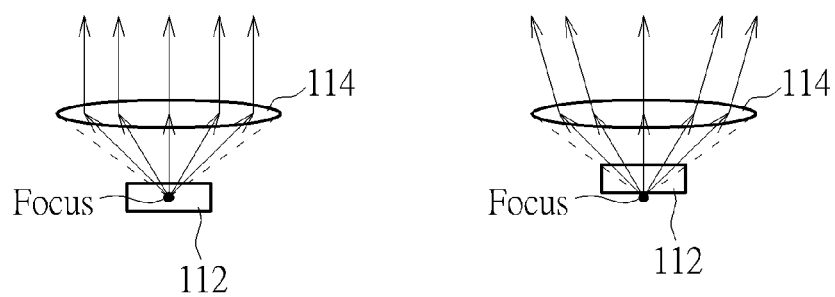
FIG. 2 is a diagram showing different lighting configurations realized by adjusting an optical lens of the handheld communications device of the present invention.

Please note that, in the present embodiment, the uniformity of the light field can be defined by the ratio of the brightness caused by the light emitted by the flashlight module 110 at the center region of the field of view (FOV) of the camera module 140 and the brightness caused by the light emitted by the flashlight module 110 at the peripheral region of the FOV of the camera module 140. Further, the lighting configurations L0-L9 may be implemented through adjusting the flash LED 112 and the optical lens 114. For example, please refer to FIG. 2, which is a diagram showing different lighting configurations realized by adjusting the optical lens 114 of the handheld communications device 100 of the present invention. As shown in FIG. 2, the left sub-diagram shows a lighting configuration of the parallel light generated when the flash LED 112 is located at the focus of the optical lens 114. On the other hand, the right sub-diagram shows a light configuration of the divergent light generated when the flash LED 112 is located inside the focal length of the optical lens 114. In other words, when the flash LED 112 is located at the focus of the optical lens 114, the most centralized light field can be obtained; and when the flash LED 112 is moved away from the focus of the optical lens 114, the light field will be more and more divergent. The flashlight module 110 can move the optical lens 114 through a voice coil motor (VCM), or through configuring a liquid crystal lens or a micro-electromechanical system lens (MEMs lens) on the optical lens 114 to adjust the relative locations of the flash LED 112 and the optical lens 114.

However, the above examples are for illustrative purposes only, and not used to limit the scope of the present invention.

Figure 3:
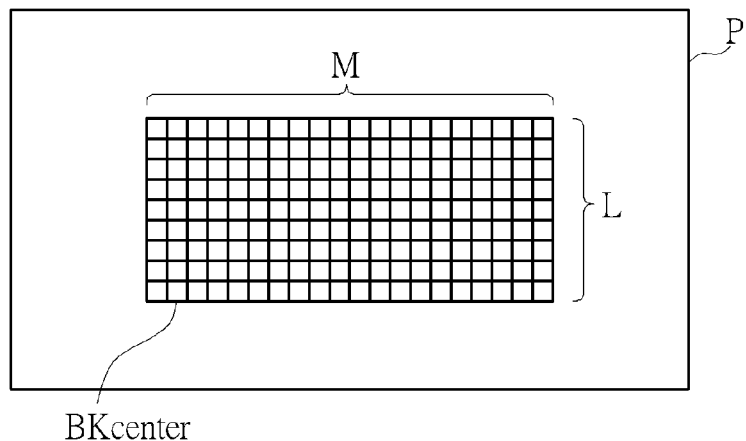
FIG. 3 is a diagram showing a detection operation performed upon a frame by a detection unit of the handheld communications device according to an embodiment of the present invention.

More specifically, when the camera module 140 is operated under the preview mode, the automatic exposure module 150 will refer to the current environment to determine whether the flashlight module 110 should enable the flash LED 112. If the automatic exposure module 150 determines that the flashlight module 110 should enable the flash LED 112, the detection unit 120 will calculate a central block brightness value Pre_Luma_Center as an attribute according to a preview image of the camera module 140. Based on the attribute obtained by the detection unit 120, the control unit 130 can select a lighting configuration from the lighting configurations L0-L9 as the default lighting configuration which is employed when the flashlight module 110 is enabled. Please refer to FIG. 3, which is a diagram showing a detection operation performed upon a frame P by using the detection unit 120 of the handheld communications device 100 according to an embodiment of the present invention. As shown in FIG. 3, the detection unit 120 will divide the central block BKcenter into L×M sub-blocks, and measure the brightness of each of the sub-blocks. Then, the detection unit 120 will average the brightness values of all sub-blocks to obtain the central block brightness value Pre_Luma_Center. After that, the control unit 1230 will compare the central block brightness value Pre_Luma_Center with a first target brightness value Pre_Black_Level. If the central block brightness value Pre_Luma_Center is smaller than the first target brightness value Pre_Black_Level, it represents that the central brightness of the frame P is not bright enough. Hence, the control unit 130 will select the lighting configuration L0 (i.e., the most centralized lighting configuration) as the default lighting configuration. If the central block brightness value Pre_Luma_Center is not smaller than the first target brightness value Pre_Black_Level, it represents that the central brightness of the frame is bright enough. Hence, the control unit 130 will select the lighting configuration L9 (i.e., the most uniform lighting configuration) as the default lighting configuration. Please note that, the camera module 140 will remain in the preview mode until the user presses the capture/shutter button. That is, after performing the aforementioned operations upon the frame currently previewed by the camera module 140, the camera module 140 will keep capturing a next preview frame, and perform the aforementioned operations upon the next preview frame to keep dynamically updating the default lighting configuration of the flashlight module 110.

Figure 4:
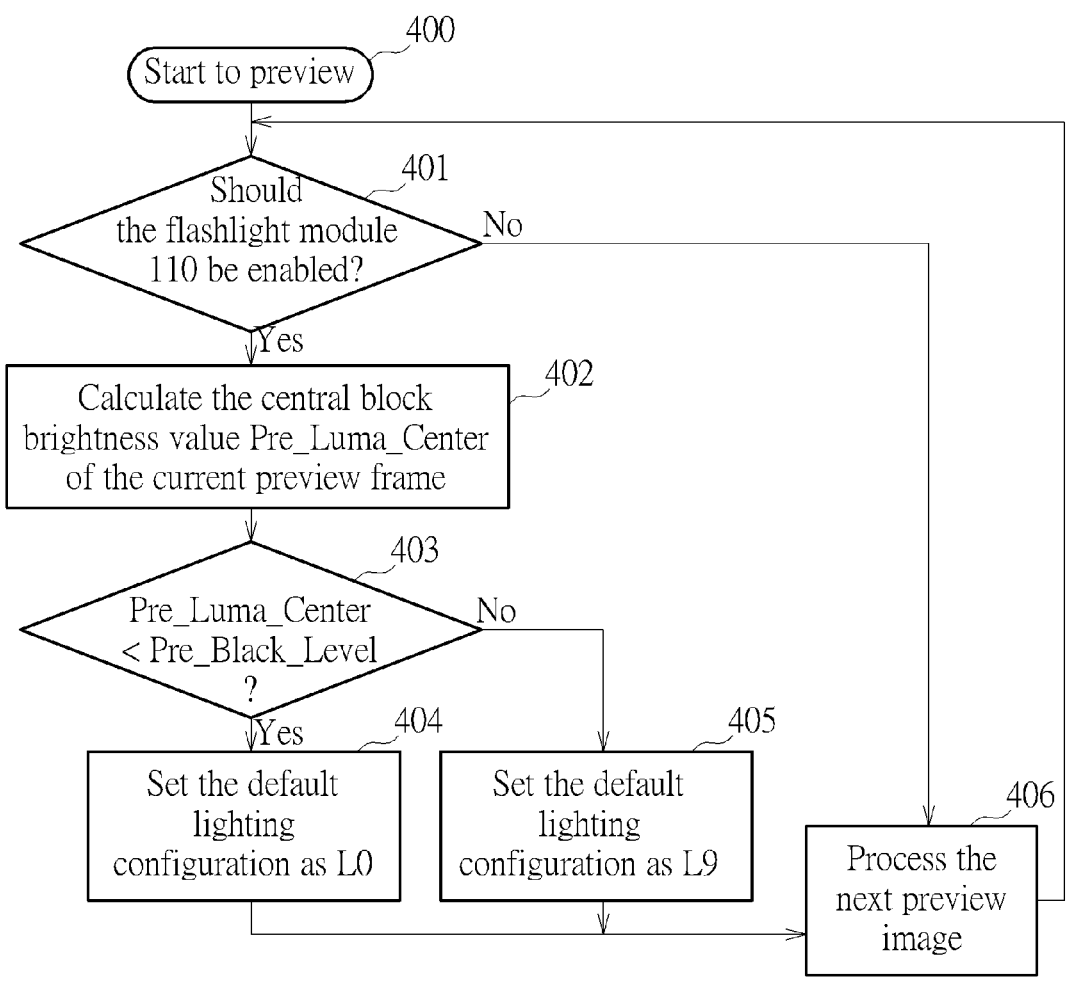
FIG. 4 is a flowchart illustrating an adjustment method for a flashlight module of the handheld communications device according to an embodiment of the present invention.

Please refer to FIG. 4, which is a flowchart illustrating an adjustment method for a flashlight module 110 of the handheld communications device 100 according to an embodiment of the present invention. Provided that the result is substantially the same, the steps are not required to be executed in the exact order shown in FIG. 4. When the camera module 140 is operated under the preview mode, the operation of the flashlight module 110 can be briefly summarized using following steps.

Step 400: Start to preview.

Step 401: The automatic exposure module determines whether the flashlight module 110 should be enabled. If yes, go to step 402; otherwise, go to step 406.

Step 402: Calculate the central block brightness value Pre_Luma_Center of the current preview frame.

Step 403: Check whether the central block brightness value Pre_Luma_Center is smaller than the first target brightness value Pre_Black_Level. If yes, go to step 404; otherwise, go to step 405.

Step 404: Set the default lighting configuration as L0 (i.e., the lighting configuration having the most centralized light field), and then go to step 406.

Step 405: Set the default lighting configuration as L9 (i.e., the lighting configuration having the most uniform light field), and then go to step 406.

Step 406: Process the next preview image, and go to step 401.

The method for adjusting the flashlight module 110 as shown in FIG. 4 is illustrated to show the operation of the flashlight module 110 under the preview mode. As a person skilled in the art can readily understand details of each step shown in FIG. 4 after reading above paragraphs directed to the handheld communications device 100, further description is omitted here for brevity.

Besides, when the user presses the capture/shutter button of the camera, the flashlight module 110 will initially use small current (torch mode) and provide assistant exposure based on the default lighting configuration determined by the process of FIG. 4. The detection unit 120 will divide the central block of a previous frame into L×M sub-blocks as shown in FIG. 3, and measure the brightness of each of the sub-blocks, respectively. If the brightness value of a sub-block is larger than a first target brightness value Pre_Black_Level and smaller than a second target brightness value Backlight_Level, the detection unit 120 will define such sub-block as a valid sub-block. The detection unit 120 calculates the number of valid sub-blocks of the previous frame as a first attribute VB1. Further, the detection unit 120 will perform the same calculation to obtain the number of valid sub-blocks of the current frame as a second attribute VB2. In this way, the control unit 130 is capable of selecting a lighting configuration from the lighting configurations L0-L9 according to the first attribute VB1 and the second attribute VB2. Please note that, if the brightness of a block is larger than the second target brightness value Backlight_Level, the block will be defined as a backlight source. Because a too bright backlight may relatively cause the main objects to be darker, the brightness components contributed by the backlight will not be taken into account during the determination of the valid blocks/sub-blocks of a frame.

In the present embodiment, when the first attribute VB1 is smaller than a threshold value N and the second attribute is larger than the threshold value N, it means that in the currently selected lighting configuration, the light emitted by the flash LED 112 just compensates for the insufficient brightness of the central block. Hence, the control unit 130 ends the operation of selecting the lighting configuration, and the flashlight module 110 performs the assistant exposure operation according to the currently selected lighting configuration. In the meantime, the camera module 140 performs the operation of capturing images.

When the first attribute VB1 is smaller than the threshold value N and the second attribute value VB2 is smaller than the threshold value N, the control unit 130 will check whether the currently selected lighting configuration is the lighting configuration L0 (i.e., the lighting configuration having the most centralized light field). If the currently selected lighting configuration is the lighting configuration L0, it represents that the currently selected lighting configuration is already the best lighting configuration. Hence, the control unit 130 will end the operation of selecting the lighting configuration, and the flashlight module 110 will perform the assistant exposure operation according to the currently selected lighting configuration. Meanwhile, the camera module 140 performs the operation of capturing images. If the currently selected lighting configuration is not the lighting configuration L0, it represents that the light field of the currently selected lighting configuration is not centralized enough. Hence, the control unit 130 will select a next lighting configuration having a more centralized light field as the lighting configuration of the flashlight module 110 (e.g. if the light field of the currently selected lighting configuration L4 is not centralized enough, the lighting configuration L3 is selected). Next, the detection unit 120 calculates a new first attribute VB1 and a new second attribute VB2 for a next frame, and the control unit 130 selects a lighting configuration from the lighting configurations L0-L9 according to the new first attribute VB1 and the new second attribute VB2.

When the first attribute VB1 is larger than the threshold value N and the second attribute VB2 is larger than the threshold value N, the control unit 130 will check whether the currently selected lighting configuration is the lighting configuration L9 (i.e., the lighting configuration having the most uniform light field). If the currently selected lighting configuration is the lighting configuration L9, it represents that the currently selected lighting configuration is already the best lighting configuration. Hence, the control unit 130 will end the operation of selecting the lighting configuration, and the flashlight module 110 will perform the assistant exposure operation according to the currently selected lighting configuration. Meanwhile, the camera module 140 performs the operation of capturing images. If the currently selected lighting configuration is not the lighting configuration L9, it represents that the light field of the currently selected lighting configuration is not uniform enough. Hence, the control unit 130 will select a next lighting configuration having a more centralized light field as the lighting configuration of the flashlight module 110 (e.g. if the light field of the currently selected lighting configuration L4 is not uniform enough, the lighting configuration L5 is selected). Next, the detection unit 120 calculates a new first attribute VB1 and a new second attribute VB2 for a next frame, and the control unit 130 selects a lighting configuration from the lighting configurations L0-L9 according to the new first attribute VB1 and the new second attribute VB2.

When the first attribute VB1 is larger than the threshold value N and the second attribute VB2 is smaller than the threshold value N, it represents that the currently selected lighting configuration is incorrect. Hence, the control unit 130 selects a previously selected lighting configuration as the lighting configuration of the flash module 110, and then ends the operation of selecting the lighting configuration. Besides, the flashlight module 110 performs the assistant exposure operation according to the recovered lighting configuration; meanwhile, the camera module 140 performs the operation of capturing images.

Figure 5:
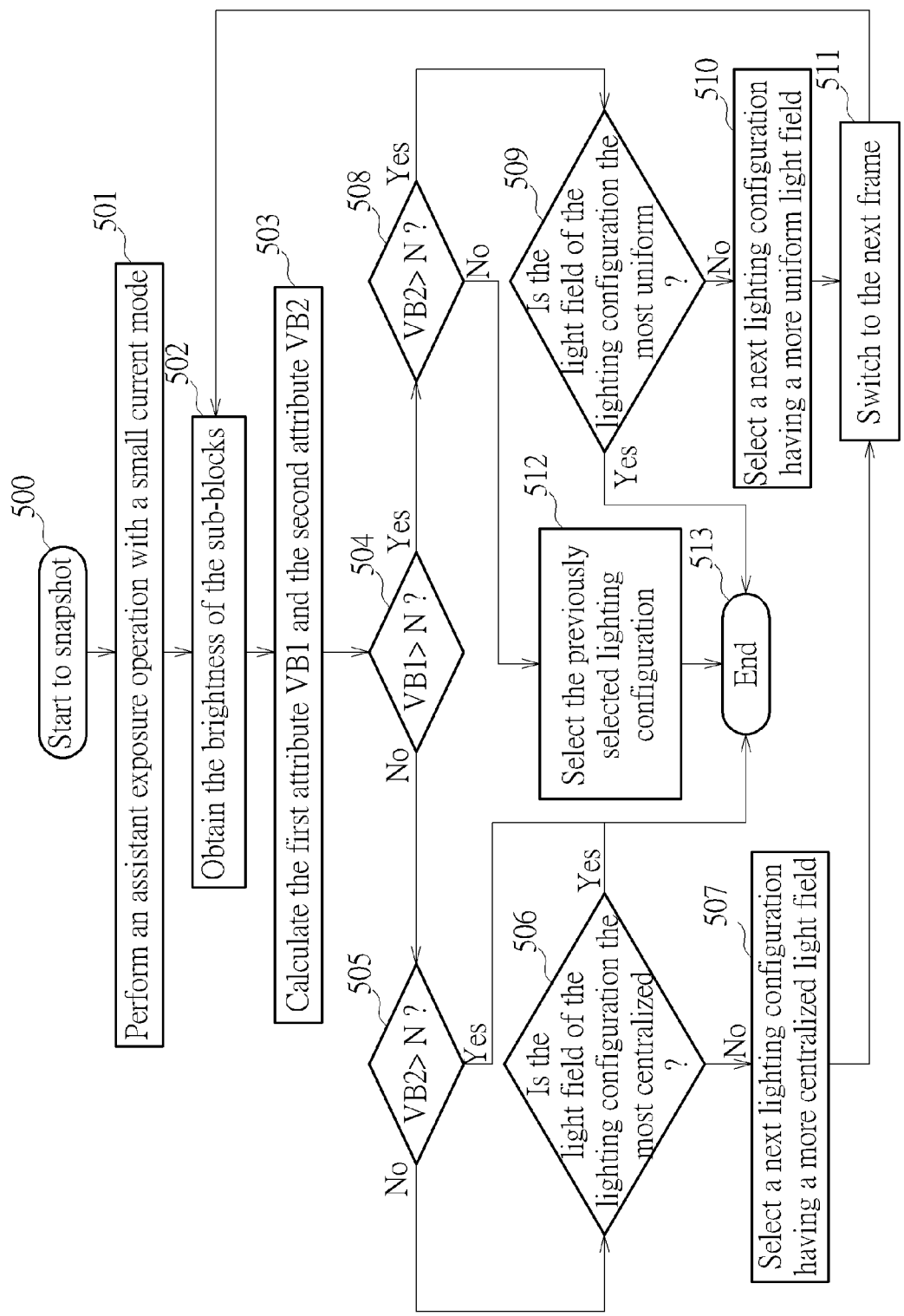
FIG. 5 is a flowchart illustrating an adjustment method for a flashlight module of the handheld communications device according to another embodiment of the present invention.

Please refer to FIG. 5, which is a flowchart illustrating an adjustment method for the flashlight module 110 of the handheld communications device 100 according to another embodiment of the present invention. Provided that the result is substantially the same, the steps are not required to be executed in the exact order shown in FIG. 5. When the user presses the capture/shutter button of the camera to enable the snapshot mode, the adjustment method for the flash module 110 is performed and can be briefly summarized using following steps.

Step 500: Start to snapshot.

Step 501: Perform an assistant exposure operation with a small current mode.

Step 502: Obtain the brightness of the sub-blocks.

Step 503: Calculate the first attribute VB1 and the second attribute VB2.

Step 504: Check whether the first attribute VB1 is larger than the threshold value N. If yes, go to step 508; otherwise, go to step 505.

Step 505: Check whether the second attribute VB2 is larger than the threshold value N. If yes, go to step 513; otherwise, go to step 506.

Step 506: Check whether the light field of the lighting configuration is the most centralized. If yes, go to step 513; otherwise, go to step 511.

Step 507: Select a next lighting configuration having a more centralized light field.

Step 508: Check whether the second attribute VB2 is larger than the threshold value N. If yes, go to step 509; otherwise, go to step 512.

Step 509: Check whether the light field of the lighting configuration is the most uniform. If yes, go to step 513; otherwise, go to step 510.

Step 510: Select a next lighting configuration having a more uniform light field, and then go to step 502.

Step 511: Switch to the next frame, and then go to step 502.

Step 512: Select the previously selected lighting configuration.

Step 513: End.

The method for adjusting the flashlight module 110 as shown in FIG. 5 is illustrated to show the operation of the flashlight module 110 under the snapshot mode. As a person skilled in the art can readily understand details of each step shown in FIG. 5 after reading above paragraphs directed to the handheld communications device 100, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustment method for a flashlight module of a handheld communications device, comprising:
    selecting a default lighting configuration from a plurality of lighting configurations;
    utilizing the flashlight module to perform an assistant exposure operation according to the default lighting configuration;
    detecting a light field of at least one frame after the assistant exposure operation is performed and obtaining at least one attribute;
    determining whether the at least one attribute satisfies a specific criterion; and
    selecting a specific lighting configuration based on the at least one attribute from the plurality of lighting configurations supported by the flashlight module, wherein the plurality of lighting configurations respectively correspond to different light fields;
    wherein the step of selecting the default lighting configuration from a plurality of lighting configurations comprises:
        detecting brightness of a frame being captured by a camera of the handheld communication device operated under a preview mode;
        dividing a central block of the frame into a plurality of sub-blocks;
        selecting a lighting configuration having the most centralized light field as the default lighting configuration when a number of sub-blocks having brightness below a predetermined brightness is smaller than a predetermined value; and
        selecting a lighting configuration having the most uniform light field as the default lighting configuration when the number of sub-blocks having brightness below the predetermined brightness is not smaller than the predetermined value.

2. The adjustment method of claim 1, wherein the at least one frame comprises a first frame and a second frame, the at least one attribute comprises a first attribute and a second attribute, and the detecting step further comprises:
    detecting brightness of a first frame;
    dividing a central block of the first frame into a plurality of sub-blocks;
    calculating a number of sub-blocks in the first frame that have brightness lower than first predetermined brightness and higher than second predetermined brightness, and obtaining the first attribute;
    detecting brightness of a second frame;
    dividing a central block of the second frame into a plurality of sub-blocks; and
    calculating a number of sub-blocks in the second frame that have brightness lower than the first predetermined brightness and higher than the second predetermined brightness and obtaining the second attribute.

3. The adjustment method of claim 2, wherein the determining step comprises:
    determining whether the at least one attribute satisfies the specific criterion when the first attribute is larger than a predetermined value, the second attribute is larger than the predetermined value, and a currently selected lighting configuration used by the flashlight module is not the lighting configuration having the most uniform light field among the plurality of lighting configurations.

4. The adjustment method of claim 3, wherein the step of selecting the specific lighting configuration comprises:
    selecting a lighting configuration having a light field more uniform than a light field of the currently selected lighting configuration from the plurality of lighting configurations as the specific lighting configuration.

5. The adjustment method of claim 2, wherein the determining step comprises:
    determining that the at least one attribute satisfies the specific criterion when the first attribute is smaller than a predetermined value, the second attribute is smaller than the predetermined value, and a currently selected lighting configuration used by the flashlight module is not a lighting configuration having the most centralized light field among the plurality of lighting configurations.

6. The adjustment method of claim 5, wherein the step of selecting the specific lighting configuration comprises:
    selecting a lighting configuration having a light field more centralized than a light field of the currently selected lighting configuration from the plurality of lighting configurations as the specific lighting configuration.

7. The adjustment method of claim 2, further comprising:
    selecting a previously selected lighting configuration used by the flashlight module as the specific lighting configuration, and stopping the step of detecting the light field of the at least one frame and obtaining the at least one attribute when the first attribute is larger than a predetermined value and the second attribute is smaller than the predetermined value.

8. The adjustment method of claim 1, further comprising:
    stopping the detecting step and obtaining the at least one attribute when the at least one attribute does not satisfy the specific criterion.

9. A handheld communications device, comprising:
a flashlight module, supporting a plurality of lighting configurations and arranged for emitting light according to a selected lighting configuration, wherein the plurality of lighting configurations respectively correspond to different light fields;
a detection unit, arranged for detecting a light field of at least one frame and obtaining at least one attribute; and
a control unit, arranged for determining whether the at least one attribute satisfies a specific criterion, and when the at least one attribute satisfies the specific criterion, selecting a specific lighting configuration based on the at least one attribute from the plurality of lighting configurations, wherein the control unit further selects a default lighting configuration from the plurality of lighting configuration, and the flashlight module performs an assistant exposure operation according to the default lighting configuration, where the detection unit detects the light field of the at least one frame after the assistant exposure operation is performed;
wherein the control unit detects brightness of a frame being captured by a camera of the handheld communication device operated under a preview mode, and divides a central block of the frame into a plurality of sub-blocks; when a number of sub-blocks having brightness below a predetermined brightness is smaller than a predetermined value, the control unit selects a lighting configuration having the most centralized light field as the default lighting configuration; and when the number of sub-blocks having brightness below the predetermined brightness is not smaller than the predetermined value, the control unit selects a lighting configuration having the most uniform light field as the default lighting configuration.

10. The handheld communications device of claim 9, wherein the at least one frame comprises a first frame and a second frame; the at least one attributes comprises a first attribute and a second attribute; and the detection unit detects brightness of a first frame, divides a central block of the first frame into a plurality of sub-blocks, calculates a number of sub-blocks in the first frame that have brightness lower than first predetermined brightness and higher than second predetermined brightness to obtain the first attribute, detects brightness of a second frame, divides a central block of the second frame into a plurality of sub-blocks, and calculates a number of sub-blocks in the second frame that have brightness lower than the first predetermined brightness and higher than the second predetermined brightness to obtain the second attribute.

11. The handheld communications device of claim 10, wherein when the first attribute is larger than a predetermined value, the second attribute is larger than the predetermined value, and a currently selected lighting configuration used by the flashlight module is not a lighting configuration having the most uniform light field, the control unit determines that the at least one attribute satisfies the specific criterion.

12. The handheld communications device of claim 11, wherein the control unit selects a lighting configuration having a light field more uniform than a light field of the currently selected lighting configuration from the plurality of lighting configurations as the specific lighting configuration.

13. The handheld communications device of claim 10, wherein when the first attribute is smaller than a predetermined value, the second attribute is smaller than the predetermined value, and a currently selected lighting configuration used by the lighting configuration is not a lighting configuration having the most centralized light field, the control unit determines that the at least one attribute satisfies the specific criterion.

14. The handheld communications device of claim 13, wherein the control unit selects a lighting configuration having a light field more centralized than a light field of the currently selected lighting configuration from the plurality of lighting configurations as the specific lighting configuration.

15. The handheld communications device of claim 10, wherein when the first attribute is larger than a predetermined value and the second attribute is smaller than the predetermined value, the control unit selects a previously selected lighting configuration used by the flashlight module as the specific lighting configuration, and stops an operation of detecting the light field of the at least one frame and obtaining the at least one attribute.

16. The handheld communications device of claim 9, wherein when the at least one attribute does not satisfy the specific criterion, the control unit stops an operation of detecting the light field of the at least one frame and obtaining the at least one attribute.

17. An adjustment method for a flashlight module of a handheld communications device, comprising:
selecting a default lighting configuration from a plurality of lighting configurations;
utilizing the flashlight module to perform an assistant exposure operation according to the default lighting configuration;
detecting a light field of at least one frame after the assistant exposure operation is performed and obtaining at least one attribute;
determining whether the at least one attribute satisfies a specific criterion; and
selecting a specific lighting configuration from the plurality of lighting configurations supported by the flashlight module, wherein the plurality of lighting configurations respectively correspond to different light fields;
wherein the at least one frame comprises a first frame and a second frame, the at least one attribute comprises a first attribute and a second attribute, and the detecting step further comprises:
detecting brightness of a first frame;
dividing a central block of the first frame into a plurality of sub-blocks;
calculating a number of sub-blocks in the first frame that have brightness lower than first predetermined brightness and higher than second predetermined brightness, and obtaining the first attribute;
detecting brightness of a second frame;
dividing a central block of the second frame into a plurality of sub-blocks; and
calculating a number of sub-blocks in the second frame that have brightness lower than the first predetermined brightness and higher than the second predetermined brightness and obtaining the second attribute.

18. A handheld communications device, comprising:
a flashlight module, supporting a plurality of lighting configurations and arranged for emitting light according to a selected lighting configuration, wherein the plurality of lighting configurations respectively correspond to different light fields;
a detection unit, arranged for detecting a light field of at least one frame and obtaining at least one attribute; and
a control unit, arranged for determining whether the at least one attribute satisfies a specific criterion, and when the at least one attribute satisfies the specific criterion, selecting a specific lighting configuration from the plurality of lighting configurations, wherein the control unit further selects a default lighting configuration from the plurality of lighting configuration, and the flashlight module performs an assistant exposure operation according to the default lighting configuration, where the detection unit detects the light field of the at least one frame after the assistant exposure operation is performed;

wherein the at least one frame comprises a first frame and a second frame; the at least one attributes comprises a first attribute and a second attribute; and the detection unit detects brightness of a first frame, divides a central block of the first frame into a plurality of sub-blocks, calculates a number of sub-blocks in the first frame that have brightness lower than first predetermined brightness and higher than second predetermined brightness to obtain the first attribute, detects brightness of a second frame, divides a central block of the second frame into a plurality of sub-blocks, and calculates a number of sub-blocks in the second frame that have brightness lower than the first predetermined brightness and higher than the second predetermined brightness to obtain the second attribute.

* * * * *